United States Patent [19]
Derroire et al.

[11] Patent Number: 5,380,385
[45] Date of Patent: Jan. 10, 1995

[54] PROCESS FOR THE MANUFACTURE OF A FLEXIBLE POLYMERIC STRUCTURE BY EXTRUSION AND THE FLEXIBLE STRUCTURE MANUFACTURED THEREFROM

[75] Inventors: Georges Derroire, Riom; Bernard Ragout, Aubiere, both of France

[73] Assignee: Caoutchouc manufacture et plastiques, Versailles, France

[21] Appl. No.: 861,644

[22] Filed: Apr. 1, 1992

[30] Foreign Application Priority Data

Apr. 4, 1991 [FR] France ................... 91 04155

[51] Int. Cl.⁶ .............................................. B29C 47/06
[52] U.S. Cl. ..................................... 156/149; 156/203; 156/217; 156/218; 156/244.11; 156/244.12; 156/244.13; 156/244.14; 138/125; 138/126; 138/127; 138/128; 138/137; 138/141; 138/151; 138/153
[58] Field of Search ............... 156/149, 203, 217, 218, 156/244.12, 244.13, 244.14, 466, 244.11; 138/125, 126, 127, 128, 129, 137, 138, 141, 144, 151, 153

[56] References Cited

U.S. PATENT DOCUMENTS

| | | | |
|---|---|---|---|
| 2,297,413 | 9/1942 | Jahn et al. | 138/56 |
| 2,800,145 | 7/1957 | Peierls et al. | 138/125 |
| 3,453,173 | 7/1969 | Isley et al. | 156/244.11 |
| 3,829,340 | 8/1974 | Dembiak et al. | 156/244.13 |
| 3,927,695 | 12/1975 | Crockwell | 138/137 |
| 4,327,248 | 4/1982 | Campbell | 156/203 |
| 4,421,823 | 12/1983 | Theisen et al. | 156/244.11 |
| 4,510,974 | 4/1985 | Natori et al. | 138/125 |
| 4,643,927 | 2/1987 | Luecke et al. | 156/244.11 |
| 4,647,509 | 3/1987 | Wallace et al. | 156/244.11 |
| 4,668,318 | 5/1987 | Piccoli et al. | |
| 4,676,936 | 6/1987 | Wallace et al. | 156/244.11 |
| 4,724,027 | 2/1988 | Piltz et al. | 156/466 |
| 4,758,455 | 7/1988 | Campbell et al. | 138/128 |
| 4,887,647 | 12/1989 | Igarashi et al. | 138/126 |
| 4,903,735 | 2/1990 | Delacour et al. | 138/144 |
| 5,000,369 | 3/1991 | Shotts et al. | 156/218 |
| 5,052,444 | 10/1991 | Messerly et al. | 138/125 |

FOREIGN PATENT DOCUMENTS

| | | |
|---|---|---|
| 951259 | 7/1974 | Canada. |
| 0051139 | 5/1982 | European Pat. Off.. |
| 0099220 | 1/1984 | European Pat. Off.. |
| 0222323 | 5/1987 | European Pat. Off.. |
| 1553641 | 1/1969 | France. |
| 1152061 | 6/1989 | Japan. |
| 1259944 | 10/1989 | Japan. |
| 1306239 | 12/1989 | Japan. |
| 674763 | 7/1990 | Switzerland. |
| 8700147 | 1/1987 | WIPO. |
| 9104432 | 4/1991 | WIPO. |

*Primary Examiner*—Caleb Weston
*Attorney, Agent, or Firm*—Nils H. Ljungman & Associates

[57] ABSTRACT

Process for the manufacture of a flexible polymeric structure comprising a sealant barrier, consisting of a multilayer film a few microns thick, oriented longitudinally, in a continuous manner, whereby all of the components of said flexible structure are intimately bonded by a final heat treatment. Flexible polymeric structures manufactured according to this process. Application to the fields of the transport of all fluids and protection against external aggressive agents.

4 Claims, 4 Drawing Sheets

PROCESS FOR THE MANUFACTURE OF A FLEXIBLE POLYMERIC STRUCTURE BY EXTRUSION AND THE FLEXIBLE STRUCTURE MANUFACTURED THEREFROM

BACKGROUND OF THE INVENTION

1. Field of the Invention

This invention relates to an extrusion process for the manufacture of flexible structures having a reinforced or unreinforced polymer base, used for the isolation of liquid, gaseous, or pulverized fluids. The process consists of the application of a film a few microns thick to an extruded flexible structure, which acts as a sealant barrier to ensure impermeability to the fluids isolated. This invention also relates to the flexible structure having an polymer base produced by the extrusion process.

Flexible structures for the isolation of fluids are most frequently fabricated in lengths by successive extrusion processes alternating with the establishment of textile or possibly metal reinforcement layers which are customary in both the thermosetting and thermoplastic polymers industry. A significant sector of this industry employs fabrication processes which utilize curing by heat treatment of the assembly of the polymer constituents of the flexible structure, which comprises an irreversible transformation which bonds polymers which may be of different types, because of their chemical affinity.

In service, the pressures of the fluids, as well as the dynamic stresses exerted, govern the selection of the reinforcement elements, while the aggressive chemical or thermal characteristics of the fluid and of the external environment govern the selection of the polymer materials constituting the flexible structure and the coating.

This invention also relates to a process for the manufacture of flexible structures by extrusion. That is, this invention relates to a process for the extrusion of flexible tubular structures with a reinforced or unreinforced polymer base, used for the transport of liquid, gaseous, or pulverized fluids, consisting of the application of a film a few microns thick which acts as a sealant barrier to ensure impermeability to the fluids transported.

Flexible tubular structures for the transport of fluids are most frequently fabricated in long lengths by successive extrusion processes alternating with the establishment of textile or possibly metal reinforcement layers by knitting, wrapping or braiding processes which are customary in both the thermosetting and thermoplastic polymers industry. That is, a flexible tubular assembly is produced by possibly first extruding an inner tuber followed by applying a reinforcement layer, and then applying a covering by extrusion. A significant sector of this industry employs fabrication processes which utilize curing by heat treatment of the assembly of the polymer constituents of the hose, which comprises an irreversible transformation which bonds polymers which may be of different types, because of their chemical affinity.

The field in question is more precisely the field of small-diameter tubes, having diameters on the order of one centimeter, used for the transfer either of modern automotive fuels—called oxygenated fuels—with high concentrations of incorporated alcohols, or the transfer of two-phase fluids in cooling systems. The liquid carried behaves like a solvent, and is easily absorbed by the conventional materials used in the internal tubes of the hoses. The specifications—e.g. those issued by the automobile manufacturers—define a very low permeability for such hoses, on the order of a few grams per hour and per square meter.

The internal tubes, made of ordinary or special elastomers, such as nitrile-base elastomers, have permeabilities which are ten times higher than those desired. A thin layer, realized in the form of a thin film of a material with high impermeability such as polyethylene terephthalate, is thus one means regularly used in the packaging industry and in the hose industry. Hose manufacturers have thus made improvements, by this means, in the conventional construction employing extrusion.

2. Background Information

Some principles of a process related to making hoses are described in Canadian Patent No. 951 259 (Goodall Rubber Company) which, while apparently denying the necessity of adherence between constituents, proposes to form a barrier film by immersing the hose in a vaporizable solvent bath. This document proposes an improvement of the impermeability to liquefied petroleum gas (LPG) of a tube made of a polyethylene-butyl mixture by using a polyester film.

Said film is used only to protect the textile reinforcement, which is then external, without attempting to achieve a bond between the constituents.

Likewise, Japanese Patent No. 1 152 061 (Tokai Rubber Industry) proposes to apply the barrier function to the transport of coolant fluids in halogenated rubber tubes by the interposition of a thin layer of polyvinylidene chloride, the purpose of which is to protect the short-fiber reinforcement of the intermediate layer.

This document applies the principle of protection by multiple plastic layers to the conventional fabrication processes employing extrusion.

Japanese Patent No. 1 306 239 (Tokai Rubber Industry) discloses a polyamide resin tube protected by a mixture of this resin with an EVA-type copolymer, without any particular indication concerning the technology to be employed for the use of these multi-layer protections.

On the other hand, Japanese Patent No. 1 259 944 (Kuraray) discloses a fabrication process by spiral winding of thin films around a tube for the transport of propane or air conditioning fluids, whereby the films can be made of ethylene and polyvinyl alcohol copolymers (EVOH), or polyethylene terephthalate (PET). The document apparently relates to the dimensional ratios of the ribbons making up these films, and the rate of their overlap, without apparently going into the bond between the components.

Finally, U.S. Pat. No. 3,927,695 (Union Carbide) applies the improvement of a barrier film to a silicon elastomer tube cured by vulcanizing in hot air and supported, during its fabrication, by a mandrel. The superimposition of the reinforcements is accomplished by spiral windings, and the seal is completed by the spiral wrapping of a polyethylene terephthalate film.

This film is rendered adhesive and suitable for use on high-speed winding machines by surface coating by means of a mixture of an olefin triazine and rubber, the subsequent heat treatment of which makes possible the bond between the silicon tube and the polyethylene terephthalate film, which normally do not adhere to one another.

Several variants are proposed to combine the polyethylene terephthalate barrier film, coated with a mixture of siloxane and triazine, with silicon elastomer tubes, constituted in all cases by superimpositions of spiral windings of calendered layers. Such multiple layers are realized on a rigid mandrel which rotates, making the high-speed wrapping operation possible. The operation has the disadvantage that it is discontinuous, and that it can only handle a limited length for all the examples cited in said document.

The above documents thus describe different solutions by incorporating, in the tubes, films which are quasi-impermeable to the fluids carried, but apparently none of the proposed solutions would make it possible to achieve the values currently required by specifications—particularly in the automobile industry—either because of the absence of an intimate bond between the components, which leaves room for the diffusion of fluids between said components, or because of a "wick" effect of the reinforcement, which facilitates the penetration of the fluid, once the internal tube exhibits the least porosity, or because of the low effectiveness of the films used as a barrier element, which must have a significant thickness.

In addition, an examination of the prior art shows that although the principle of the installation of a barrier film inside the components of a flexible tube is well established, on the other hand there is apparently no known technique for continuous fabrication which does not require the discontinuous manufacture of a blank, but which still achieves an intimate adherence among the components.

The invention relates not only to the realization of flexible tubes, but also to the realization of any flexible tubular structure such as, to cite several non-restricting examples, expansion compensators or sheathed electric cables, which must be sealed either against the fluids carried or against aggressive external agents such as oxygen or ozone.

OBJECT OF THE INVENTION

The object of the invention is a continuous fabrication process, combined with the conventional processes of the polymers industry, which makes possible the incorporation in a flexible polymeric structure and the intimate bonding to the other components, during fabrication, of a multilayer film a few microns thick forming a barrier which is impermeable to the fluids carried, said multilayer film a few microns thick being constituted by a barrier film of polymer material exhibiting a very low permeability index, adhering to a contact film or in a sandwich between two contact films—of the same type or different types—the latter having an affinity for the components they face, to establish an intimate physicochemical bond among all the components of the flexible polymeric structure, said multilayer film remaining a few microns thick.

The invention also relates to the flexible polymeric structure-manufactured by using said process. The invention also relates to a process for the manufacture of a flexible tubular structure and the flexible tubular structure made by using the process.

SUMMARY OF THE INVENTION

The invention is therefore a process for the making of a flexible polymeric or elastomeric structure consisting of a first polymeric or elastomeric layer, which may have a reinforcement layer and a second polymeric or elastomeric layer, and which also includes a sealant barrier either against the fluids carried or against outside aggressive agents.

The invention is also a process for the realization of a flexible tubular structure consisting of an internal tube, which may have a reinforcement layer and an exterior coating, and which also includes a sealant barrier either against the fluids carried or against outside aggressive agents.

The invention is characterized by the fact that said sealant barrier, consisting of a multilayer film a few microns thick, is oriented longitudinally in a continuous manner, in the form of a ribbon, to form an envelope, the overlapping of whose strips is parallel to the generatrices of the flexible tubular structure. The closing of said multilayer film a few microns thick is ensured by the sealed superimposition of its surfaces on the surface of said overlap, and by the fact that a final heat treatment creates an intimate bonding between all the constituent elements of the flexible tubular structure.

The multilayer film a few microns thick consists of at least one barrier film, designed to perform the sealing function, and at least one contact film, designed to provide on one hand the closing of the edges of the multilayer film a few microns thick on themselves, and on the other hand the bonding to the elements of the flexible tubular structure with which the multilayer film is in contact.

The invention also relates to the flexible tubular structures, such as the tubes, hoses, sheaths or expansion compensators, which include a sealant barrier against the fluids carried or aggressive external agents, realized according to the process which is the object of the invention.

Preferably, the multilayer film a few microns thick which forms a sealant barrier is between 15 and 40 microns thick, the barrier film having a thickness between 10 and 30 microns and the contact film having a thickness between 3 and 5 microns.

The nature of the barrier film is a function of the nature of the fluid carried or of the exterior aggressive agent. In general, for example, the barrier films which have good impermeability to water vapor are rather permeable to gases, with the exception of polyvinylidene chloride, which has excellent impermeability to both.

The most effective polymers, in terms of their barrier properties, are, for impermeability to gases, the chloroethylene polymers, polyethylene terephthalate, ethylene/polyvinyl alcohol copolymers, polyamides or copolyamides, while for impermeability to water vapor, they are, in addition to polyvinylidene chloride and polyethylene terephthalate, polychlorotrifluoroethylene, oriented polypropylene, and high and low density polyolefins; impermeability to hydrocarbons in general, and more particularly to modern fuels, is even more difficult to achieve. Among the polymers which offer the best barrier properties we can cite the polyamides 11 and 12, curable polyethylene and polyethylene terephthalate.

The contact film, for its part, must have qualities of affinity to the barrier film, on one hand, a capability of adherence—after appropriate treatment—to the components of the constituent elements of the flexible tubular structure with which they are in contact, and it must also be able to be sealed on itself.

For the realization of the contact film, preference goes to the selection of chloroethylene polymers, ethylene/vinyl alcohol copolymers, treated polyolefins or olefin copolymers.

The multilayer film a few microns thick is realized by coating, by coextrusion, generally combined with blowing, or by co-injection.

One feature of the invention resides broadly in a process for the manufacture of a flexible polymeric structure, said process comprising the steps of: extruding a first polymeric layer; applying a sealant barrier to said first polymeric layer, said sealant barrier comprising a multilayer film, said multilayer film being a few microns thick; overlapping a first portion of said sealant barrier with a second portion of said sealant barrier to create an overlapped portion of said sealant barrier extruding a second polymeric layer onto said sealant barrier, so that said sealant barrier lies between said first polymeric layer and said second polymeric layer; applying a reinforcement layer to said second polymeric layer; extruding a third polymeric layer onto said reinforcement layer; heat treating said polymeric structure to achieve an intimate bonding of all layers of said flexible polymeric structure and to seal said overlapped portion of said sealant barrier.

Another feature of the invention resides broadly in a process for the manufacture of a flexible polymeric structure, said process comprising the steps of: extruding a first polymeric layer; applying a sealant barrier to said first polymeric layer, said sealant barrier comprising a multilayer film and said sealant barrier being a few microns thick; overlapping a first portion of said sealant barrier with a second portion of said sealant barrier to create an overlapped portion of said sealant barrier; and sealing said overlapped portion of said sealant barrier.

Yet another feature of the invention resides broadly in a flexible polymeric structure comprising: a first polymeric layer formed by extrusion; a sealant barrier applied to said first polymeric layer, said sealant barrier comprising a multilayer film and said sealant barrier being a few microns thick; a first portion of said sealant barrier overlapped with a second portion of said sealant barrier to create an overlapped portion of said sealant barrier; and said first portion of said sealant barrier sealed to said second portion of said sealant barrier.

BRIEF DESCRIPTION OF THE DRAWINGS

The special features of the invention, and of its variants, will be explained in greater detail below, with reference to the accompanying drawings, in which.

DESCRIPTION OF THE PREFERRED EMBODIMENTS

Figure 1:
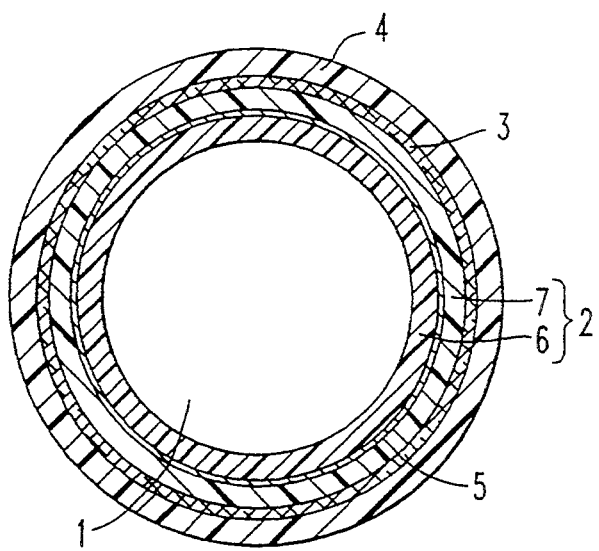
FIG. 1 represents the cross section of a flexible tubular structure realized according to the process which is the object of the invention.
Figure 1A:
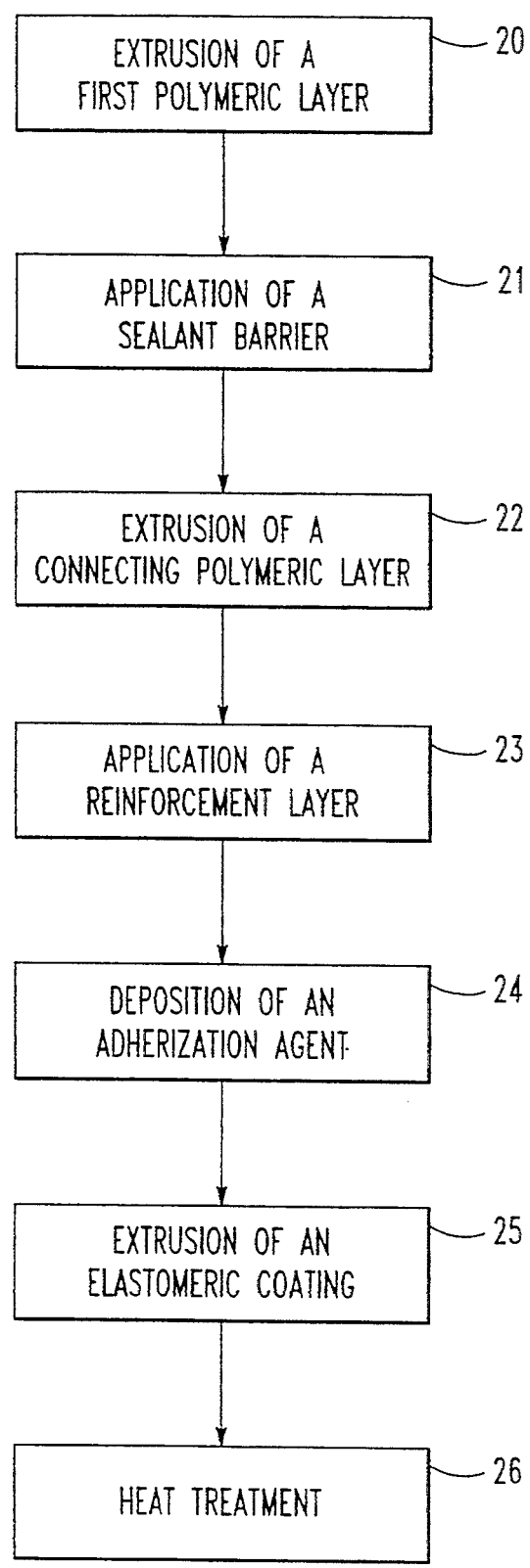
FIG. 1a is a block diagram illustrating the process of manufacturing a flexible polymeric structure.

FIG. 1a is a block diagram showing the process for the manufacture of a flexible polymeric structure. The initial step involves the extrusion of an inner polymer layer 20. The inner polymeric layer is to be in contact with the fluid to be isolated or transported. The second step in the manufacturing process is the application of a sealant barrier 21. The sealant barrier has the purpose of making the polymeric structure impermeable to the fluid to be isolated or transported. The third step in the manufacturing process is the extrusion of a connecting polymer layer 22. Thus, the sealant barrier is positioned between two layers of polymer. Alternately, the extrusion of an inner polymer layer 20 can be eliminated, and the application of the sealant barrier 21 forms the innermost layer of the flexible polymeric structure. The fourth step in the manufacturing process is the installation of a reinforcement layer 23. The reinforcement layer is installed on top of the connecting layer. The fifth step in the manufacturing process is the deposit of an adherization agent 24 on the reinforcement layer. The sixth step in the manufacturing process is the extrusion of an polymer coating 25 over the reinforcement layer. Lastly, the flexible polymeric structure is subject to a heat treatment 26 to ensure an intimate bonding of all the elements of the structure.

Figure 1B:
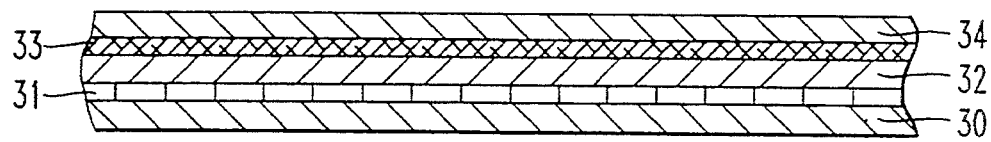
FIG. 1b illustrates a cross section of the flexible polymeric structure manufactured by the process.

FIG. 1b shows a cross section of the flexible structure manufactured by the process. Inner polymer layer 30 is to be in contact with the fluid being isolated or transported. Sealant barrier 31 is in contact with inner polymer layer 30. Connecting polymer layer 32 and inner polymer layer 30 sandwich sealant barrier 31 therebetween. A reinforcement layer 33 is located on top of the connecting polymer layer 32. Lastly a coating 34 covers the reinforcement layer 33.

Figure 1C:
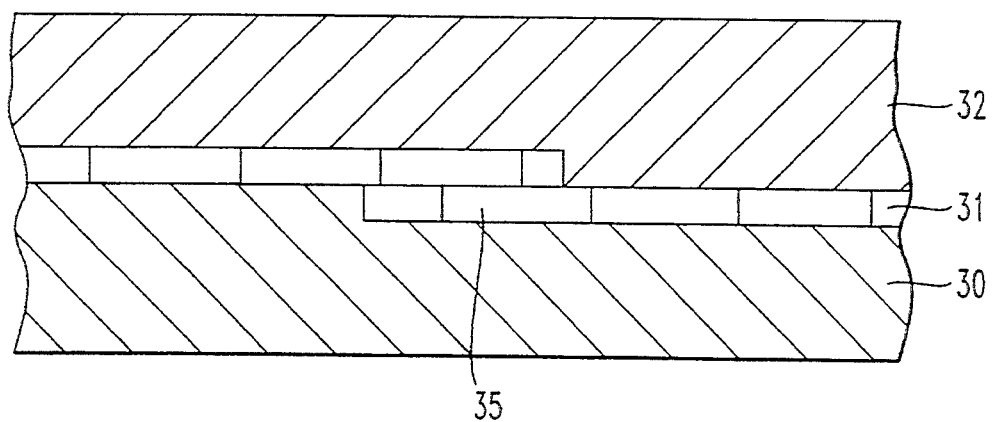
FIG. 1c illustrates an enlarged portion of a cross section of the flexible polymeric structure.

FIG. 1c shows an area of overlap 35 of sealant barrier 31. The sealant barrier 31 is shown between inner polymer layer 30 and connecting polymer layer 32. Depending on the shape and size of the flexible structure an area of overlap 35 of sealant barrier 31 may be necessary. The heat treatment of the flexible structure will intimately bond the ends of sealant barrier 31 which overlap in the area of overlap 35. Thus, a continuous sealant barrier 31 is created from a discontinuous material.

FIG. 1 shows the cross section of a flexible tubular structure realized according to the process which is the object of the invention.

The fluid transfer zone 1 is defined by the inside diameter of the flexible tubular structure, and is confined by the internal tube 2. The resistance to pressure is provided by the reinforcement layer 3, installed by knitting, wrapping or braiding over the internal tube 2, which internal tube 2 is made by extrusion, and it is protected against external aggression by the coating 4.

Nevertheless, the porosity of the polymer material which usually makes up the internal tube 2 allows the fluid carried to migrate inside said polymer material up to the reinforcement layer 3, where the fluid can cause different types of damage: both a deterioration of the mechanical characteristics of the reinforcement material, a loss of the intrinsic performance characteristics of the flexible tubular structure itself caused by separation among the components, or even an impregnation of the coating 4, to the point of causing odors and pollution of the environment, or even the risk of inflammation, if the fluid being carried is a fuel. To remedy all of these shortcomings and these risks, a sealant barrier 5 is interposed between the inside wall and the reinforcement layer 3 of the flexible tubular structure.

The sealant barrier 5 is shown incorporated, for example in mid-thickness, inside the internal tube 2, thereby separating internal tube 2 into a layer in contact with the fluid carrier, forming an interior coat 6, and another layer around the sealant barrier 5 forming connecting tube 7, so that said connecting tube 7 is completely protected against any impregnation by the fluid carried. Said connecting tube 7 provides the mechanical link between the internal tube 2 and the reinforcement layer 3. As shown, the construction of the flexible tubular structure requires as many extrusions as there are successive layers realized by means of suitable extruders, depositing an additional layer on the very long blank realized in the preceding stage. The blank, at each stage, is carried either on a succession of rigid rods or on a flexible mandrel, or even on a simple tube which has been made sufficiently rigid to accept the subsequent extrusions. The interior coat 6 may be reduced to the simple interior coating of the multilayer film a few microns thick constituting the sealant barrier 5, which must be intimately bonded, by adherization during the thermal treatment, to the polymer materials of the connecting tube 7 and of said interior coat 6. In an embodiment, interior coat 6 can be eliminated, so that sealant barrier 5 is the innermost layer of the flexible tubular structure.

The same mechanical connection, obtained by a physico-chemical method, under the action of the addition of heat, is necessary for the cohesion between said connecting tube 7 and the coating 4, via the textile structure of the reinforcement layer 3. If the latter consists of several thicknesses, e.g. of two wrapped layers wound spirally in opposite directions, a bonding layer (not shown) which has good mechanical qualities can be interposed between said layers of the reinforcement layer 3. The base polymer of said bonding layer must then-necessarily be protected against any migration of the fluid carried through the internal tube 2, thereby providing additional justification for the role of the multilayer film a few microns thick which performs the function of a sealant barrier 5.

Figure 2A:
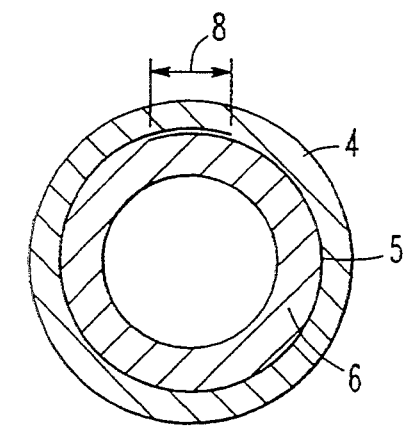
FIG. 2a and 2b illustrate the constitution of two flexible tubular articles, a tube and a hose, which have an integrated sealant barrier.
Figure 2B:
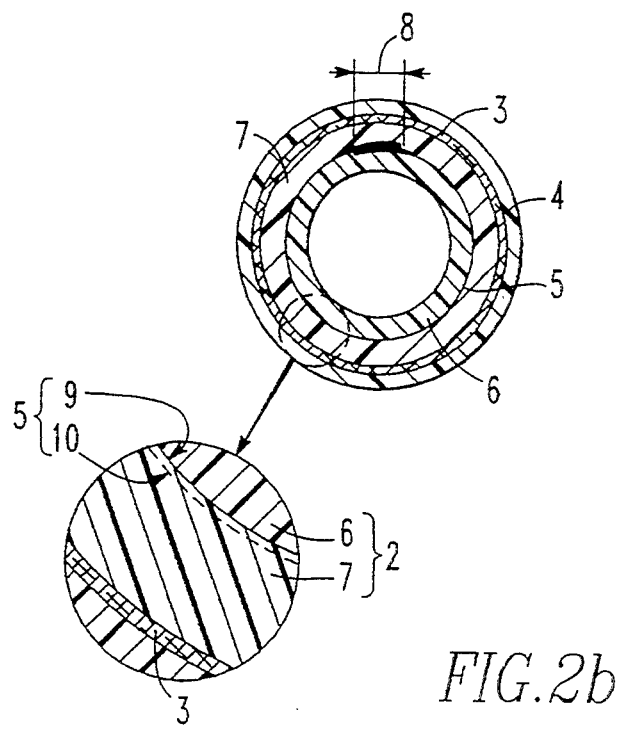

FIGS. 2a and 2b contain two diagrams explaining the makeup of two flexible tubular articles with an integrated sealant barrier: in FIG. 2a, a tube, i.e. a hose minus the reinforcement layer, and in FIG. 2b, a flexible hose which includes a reinforcement layer 3, e.g. made of textile.

The two types of articles are constituted, in contact with the fluid transported, by means of an interior coat 6, which can be made, to cite one non-restricting example, of a polymer composition based on a blend of nitrile rubber and polyvinyl chloride. The sealant barrier 5 is realized by jacketing, with an overlap of the strips 8 over a circumferential length which is at most equal to the value of the nominal diameter. That is, the sealant barrier 5 surrounds the circumference of interior coat 6 by overlapping of strips 8.

To cite one non-restricting example, and because here, said sealant barrier B is integrated into the internal tube 2, the multilayer film a few microns thick, which constitutes the sealant barrier 5 is advantageously composed of a barrier film 9—made of polyethylene terephthalate—sandwiched between two contact films 10—made of polyvinylidene chloride—since the latter material is capable of being welded either to itself in the zone of the overlap of the strips 8, after having received the subsequently extruded layer forming the connecting tube 7 or the coating 4. That is, the sealant barrier is either integrated into internal tube 2 as shown in FIG. 2b, or the sealant barrier is between the interior coat 6 and the coating 4 as shown in FIG. 2a.

The relative thicknesses of the multilayer film a few microns thick on one hand, and the interior coat 6 and the connecting tube 7, between which the multilayer film is inserted, on the other hand, have the effect of compensating for the significant differences in the modulus of elasticity of said components during deformations, in service, of the flexible tubular structure. Thanks to the complete adherence between the multilayer film a few microns thick and the materials surrounding it which have a much lower modulus of deformation, the sealant barrier 5 is capable of bending or forming undulations so that it can respond, at no risk, to the deformations experienced by said flexible tubular structure during utilization.

In one non-restricting example, the barrier film 9 has a thickness of 25 microns, and the thickness of the contact films 10 is 3 to 5 microns. The overlap of the strips 8 is from 8 to 10 millimeters, and the thicknesses of the internal tube 2 and the coating 4 is 3 millimeters, for a diameter of the passage for the fluid transported of 12 millimeters.

Figure 3:
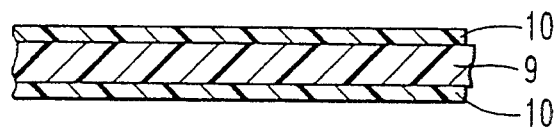
FIG. 3 illustrates one example of a multilayer film a few microns thick constituting a sealant barrier, to be integrated into the wall of a flexible tubular structure.

FIG. 3 is a diagram of the composition of the multilayer film a few microns thick which, for the example having the size indicated above, is used in the form of a ribbon 45 millimeters wide, oriented longitudinally.

To cite one non-restricting example, the barrier film 9 is preferably made of polyethylene terephthalate and advantageously has a thickness of 10 to 30 microns.

It is given a preparatory physical and/or chemical treatment to guarantee its adherence, thanks to a coating by a solution of polyvinylidene chloride, depositing on each side a layer of 3 to 5 microns forming the contact films 10, and making possible, after drying, the subsequent handling of the multilayer film a few microns thick. That is, the contact films 10 are produced by the application of the solution of polyvinylidene chloride.

One particular characteristic of polyvinylidene chloride is that it achieves complete adherence to other polymers, such as nitrile or hydrogenated nitrile rubber, blends of nitrile rubber and polyvinyl chloride, for example, during a heat treatment in the neighborhood of 140 to 180 degrees Celsius. Apart from this affinity for facing polymers, polyvinylidene chloride at these temperatures has the ability to be sealed on itself, which makes possible the realization of a continuous envelope, with an overlap having a constant cross section, because the internal and external surfaces of the contact film 10 are then combined. The overlap of the strips 8 therefore connects the barrier film 9 made of polyethylene terephthalate having a high modulus to itself, over a width on the order of one thousand times the thickness of the contact film 10, i.e. approximately two hundred times the thickness of the multilayer film a few microns thick.

The intimate bond with the polymers of the internal tube 2 which surround it, on account of the lower modulus of deformation of said components, makes possible the mechanical flexing of the flexible tubular structure over the conventional radii.

The flattening of the flexible tubular structure in service is avoided because of the significant thickness of the constituent polymers of the internal tube 2.

In local deformations, in operation, the intimate bond due to the adherization is essential to avoid separation between components having different deformabilities, a separation which could translate into longitudinal migrations of the fluid carried because of a local defect, reaching the reinforcement layer 3 or the coating 4 through pores beyond the weak point. That is, a local defect in interior coat 6 could allow fluid to migrate longitudinally up to the reinforcement layer 3 or the coating 4, if there is not an intimate bond among all the layers of the flexible tube.

Figure 4:
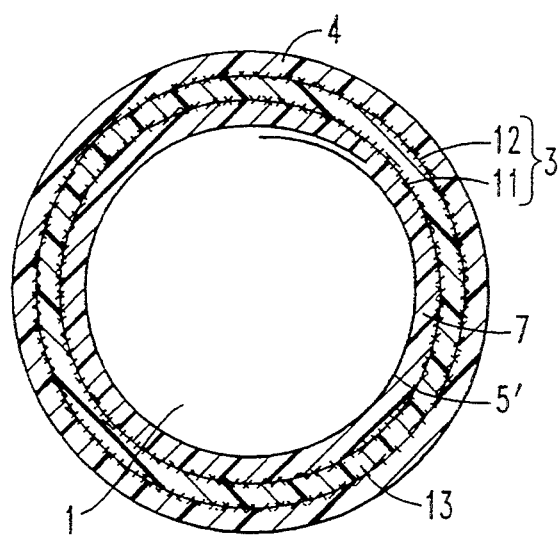
FIG. 4 shows the cross section of an expansion compensator, including-a-sealant barrier in contact with the fluid carried.

FIG. 4 is a cross section of a flexible tubular structure such as the cylindrical portion of an expansion compensator sleeve for an industrial pipeline, between its rigid fastening flanges.

The resistance of said expansion compensator sleeve to the installation pressure is guaranteed by a number of reinforcement layers 3, e.g. made of textile, shown here as two layers. An inside layer 11, in intimate contact with the connecting tube 7 and an outside layer 12, also in intimate contact with the coating 4, are mechanically connected by means of a bonding polymer 13, whose adherence through these reinforcement layers 3 to the surrounding polymers guarantees the cohesion of the assembly following heat treatment. The high-level seal is here guaranteed, in the internal portion of said expansion compensation sleeve, by the presence of a sealant barrier 5', intimately bonded to the connecting tube 7, by the superimposition on the barrier film 9 of the contact film 10, the assembly forming the multilayer film a few microns thick, which sealant barrier 5' being here in contact with the fluid transported. That is, barrier film 9 is sealed to connection tube 7 by contact film 10 which is placed therebetween.

Figure 5:
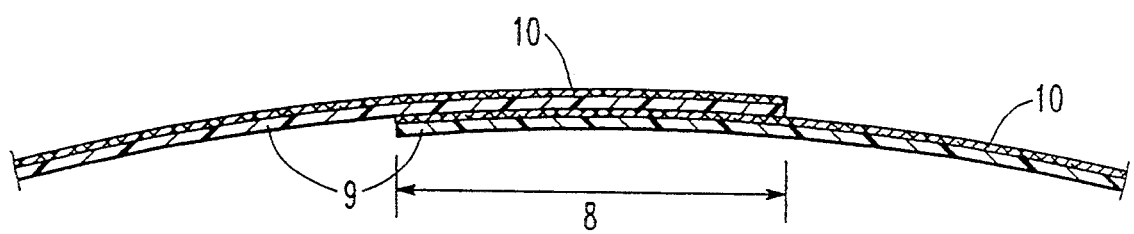
FIG. 5 illustrates, by means of an example, the constitution of multilayer films several microns thick which can be used in the internal wall of flexible tubular structures.

FIG. 5 can be considered an enlargement of FIG. 4, showing in greater detail the multilayer film a few microns thick which forms a sealant barrier 5', in contact with the fluid transported. To cite one non-restricting example, the barrier film 9 can be made of high-density polyethylene, in which case the contact film 10 can then be made of a film of a compatible polymer compound, to ensure the bond with the constituent material of the connecting tube 7. A physico-chemical preparation makes possible the realization of an intimate bond between the high-density polyethylene and the polymer composition, during a thin layer calendering.

In spite of a difference in the modulus of deformation of the materials which can exceed a factor of 100, the overlapping of the strips 8 provides a mechanical connection over the entire surface between the two strips of the barrier film 9, separated by a layer of the contact film 10, with which the barrier film 9 is covered on one of its surfaces. The fluid carried is thus in contact only with the material of the barrier film 9, and the intimate bond with the polymer of the connecting tube 7 makes possible the mechanical deformations of the entire flexible tubular structure used, for example, as an expansion compensator sleeve between rigid elements of industrial pipelines.

By way of illustration, several orders of magnitude of the permeabilities of the barrier films 9 and the contact films 10 are indicated below, as a function of the nature of the agent against which the multilayer film a few microns thick must provide the seal. Among the chloroethylene polymers, polyvinylidene chloride exhibits the best impermeability to gases, and more particularly to oxygen, so that, at ambient temperature and 0% relative humidity, its permeability is from 2 to 25 cubic centimeters per square meter of surface, the thickness being reduced to 1 micron, and under a pressure differential of 1 bar.

Under these same conditions, the gas permeability of a sheet of ethylene and vinyl alcohol copolymer is on the order of 4 to 60 cubic centimeters, that of polyethylene terephthalate is on the order of 1500 cubic centimeters, and that of polyamide 6 is on the order of approximately 2000 cubic centimeters.

The permeability to water vapor, measured at 40 degrees Celsius and 90% relative humidity, for a thickness of one micron and per square meter of surface, is a maximum of 80 grams for chloroethylene polymers, including polyvinylidene chloride, approximately 15 grams for polychlorotrifluoroethylene, and between 150 and 600 grams, under the same conditions, for polyolefins.

Measured according to the conditions of the specifications issued by the automobile manufacturers, the permeability to hydrocarbons gives the following experimental values, expressed in grams per hour and per square meter of sheet: 0.15 gram for a sheet of polyethylene terephthalate having a thickness of 12 microns, 1 gram for a sheet of polyamide-11 with a thickness of 400 microns although this value is 1.6 grams for a sheet of polyamide-12 320 microns thick, and 58 grams for a sheet of cured polyethylene 100 microns thick.

Although the impermeability of a multilayer film cannot be considered as resulting strictly from the direct mathematical addition of the impermeability of the individual films of which it is composed, the best sealant barriers are obtained by the realization of multilayer complexes, including individual films of different polymer types.

In such multilayer films, the barrier film 9 is generally made of polyethylene terephthalate—oriented or non-oriented—, ethylene and vinyl alcohol copolymer, oriented polypropylene or chloroethylene polymers such as polyvinylidene chloride. The contact film 10 is most often made of polyolefin—polyethylene or polypropylene—which may be oriented or curable, or of polyvinylidene chloride, sealable or bondable polymer materials. To give several examples of preferred combinations of barrier film 9 and contact film 10, the following designations will be used:

| PET | polyethylene terephthalate |
| PE | polyethylene |
| PP | polypropylene |
| OPP | oriented polypropylene |
| PEBD | low-density polyethylene |
| PEHD | high-density polyethylene |
| EVA | ethylene/vinyl acetate copolymers |
| PA | polyamides |
| PVC | polyvinyl chloride |
| PVDC | polyvinylidene chloride |
| EVOH | ethylene/vinyl alcohol copolymers. |

Thus the preferred combinations of barrier films 9 and contact films 10, to form a multilayer film a few microns thick used as a sealant barrier 5 or 5', can be represented by:

PET/PVDC, PEBD/PVDC, PA/PE or PP, PEBD/EVA, PE/PVDC,

EVOH/PEHD for complexes with two films,

PE or PP/PVDC/PE or PP, PE or PP/EVOH/PE or PP,

PVC/PE/PVC, PVDC/OPP/PVDC, PVDC/PET/PVDC, for complexes with three films.

It is also possible to form, on the basis of the polymers cited above, multilayer films a few microns thick with three asymmetrical films, or even assemblies made up of 4 or 5, or even 6, combined films.

Among the possible combinations the multilayer films a few microns thick made of PE/PVDC, PA/PE, EVA/PE/PET/PVDC, exhibit the best seal against gases. The complexes PA/PE/PVC/PVDC, or EVA/PA/PP or PE, exhibit the best seal against water vapor, and PET/PVDC, PVDC/PET/PVDC, or even PA/PE exhibit the best seal against hydrocarbons.

To make the multilayer film a few microns thick, the conventional processes consist of treating the barrier film 9, which for its part is fabricated using the conventional extrusion or calendering techniques, followed by cutting into ribbons to the optimum width for the application.

The barrier film 9 is processed, in wide widths or in the form of a ribbon, e.g. by coating in liquid phase, by the polymer material constituting the contact film 10, such as—to cite one non-restricting example—a chloroethylene polymer, and in particular polyvinylidene chloride, with immediate evaporation of the solvent. The dried and cooled multilayer ribbon can be wound up on itself without sticking until it is used.

To form the sealant barrier 5 on a flexible tubular structure, the rest of whose fabrication is conventional, the multilayer film a few microns thick is interposed, after the constitution of an inside coat 6 if necessary, on a rigid or flexible mandrel, e.g. by extrusion followed by a cooling.

A conical guide changes the multilayer film a few microns thick from the plane shape to the cylindrical shape, continuously enveloping the blank of the flexible tubular structure, at a progressive angle which is sufficient to prevent any deformation. A controlled braking of the spool supporting this multilayer film a few microns thick is the essential parameter controlling the unwinding of the spool at the speed of travel of the flexible tubular structure during manufacture. The overlapping of the strips 8 is necessary, and is confined by the subsequent entry of the continuous blank into an extruder, which installs the connection tube 7, under an elevated pressure, during passage through the extrusion head. After knitting, braiding or spiral wrapping of the layers of the reinforcement layer 3, the intermediate blank for the flexible tubular structure thus manufactured is given the coating 4, according to a similar process.

The process of manufacturing a flexible tubular structure is a continuous process including continuous extrusion. In addition, the barrier layer is applied in a continuous step as discussed above.

Depending on the type of support which may be used as a mandrel, the blank of the flexible tubular structure is then either cut to the length of the rods used as rigid mandrels and conformed, or is wound on spools thanks to the use of a flexible mandrel, so that it can be introduced, for heat treatment, in an autoclave of appropriate size, or can be subjected to a heat treatment, in a continuous manner, e.g. by passage through a salt bath or in a high-frequency tunnel.

In summary, the process which is the object of the invention, for the realization of the flexible tubular structure illustrated, includes the following successive steps:

- possible extrusion of the interior coat 6, generally on a mandrel;
- installation of the multilayer film a few microns thick with overlapping of the strips 8 parallel to the axis of the flexible tubular structure, the multilayer film being installed directly on the mandrel or on the interior coat 6 if an interior coat 6 was extruded, said multilayer film a few microns thick either being constituted previously on an independent piece of equipment, or simultaneously;
- extrusion of the connection tube 7 above the multilayer film a few microns thick;
- knitting, wrapping or braiding of the first layer of the reinforcement layer 3, by a knitting machine, a wrapping machine or a braiding machine, over the connecting tube 7;
- possible deposit, e.g. by atomization, of an adherization agent on the first layer of the reinforcement layer 3;
- possible knitting, wrapping or braiding of the second layer of the reinforcement layer 3 over the layer formed by the adherization agent;
- extrusion of the coating 4 over the reinforcement layer 3;
- final heat treatment under pressure, designed to ensure the intimate bonding of all the constituent elements of the flexible tubular structure, interior coat 6, multilayer film a few microns thick forming the sealant barrier 5, connecting tube 7, reinforcement layer 3, and its adherization agent and covering 4;
- removal of the flexible tubular structure from the rod or mandrel, following its cooling.

All these processes have in common the use of techniques which can be operated continuously, over lengths which are measured in the hundreds of meters, so that the components must be available for assembly in uninterrupted fashion.

The process for the realization of a flexible tubular structure incorporating a sealant barrier according to the invention has the following advantages:

- it is easily integrated in a conventional fabrication, by the incorporation of a station for the installation of the multilayer film a few microns thick forming the sealant barrier, without modifying the techniques which make it possible to realize other types of flexible tubular structures on the same means;
- it makes it possible, simply by changing the constitution of the multilayer film a few microns thick, to meet the requirements set by different specifications for applications carrying different fluids, or to provide protection against external aggressive agents;
- it makes possible the choice of reinforcement layers, independently of their compatibility with the fluids transported;
- it shifts, in an economical manner, the sealing function, which has heretofore been demanded of the constituent material of the internal tube of the flexible tubular structure, to the multilayer film a few microns thick;
- it is compatible with the shaping processes using flexible mandrels, which result in non-linear shapes following a heat treatment of the blanks.

A technician skilled in the art can apply the process for the realization of flexible tubular structures with incorporated sealant barriers and its variants, as well as the variant constitutions of the multilayer film a few microns thick, to different articles produced continuously, without going beyond the context of the invention.

An alternative, to a multilayer film which comprises at least one barrier film and at least one contact film, is a single layer or monolayer barrier film a few microns thick. The single layer barrier film can comprise any of the polymers listed above which have good barrier properties. The monolayer film a few microns thick consists of one barrier film, designed to perform the sealing function and also the bonding to the elements of the flexible tubular structure with which it is in contact. The monolayer film a few microns thick must have qualities of affinity—after appropriate treatment—to the components of the constituent elements of the flexible tubular structure with which they are in contact, and it must also be able to be sealed on itself. Preferably, the monolayer film a few microns thick which forms a sealant barrier is between 10 and 40 microns thick.

The sealant barrier 5, as discussed above, can also be a single layer barrier film. To cite one non-restricting example, with reference to FIG. 2a and FIG. 2b, and because here, said sealant barrier 5 is integrated into the internal tube 2, the monolayer film a few microns thick, which constitutes the sealant barrier 5, is advantageously composed of polyethylene terephthalate, polyvinyl chloride or polyvinylidene chloride—materials capable, after treatment if necessary, of being bonded to themselves in the zone of the overlap of the strips 8, after having received the subsequently extruded layer forming the connecting tube 7 or the coating 4. The monolayer film a few microns thick has a thickness of 15 microns. The overlap of the strips 8 is from 8 to 10 millimeters, and the thicknesses of the internal tube 2 and the coating 4 is 3 millimeters, for a diameter of the passage for the fluid transported of 12 millimeters. In this dimensional example, monolayer film a few microns thick is used in the form of a ribbon 45 millimeters wide, oriented longitudinally. It may be given a preparatory physical and/or chemical treatment to guarantee its adherence to the facing components of the flexible tubular structure. The strips 8 therefore overlap over a width on the order of 500 times the thickness of the monolayer film a few microns thick.

To give several examples of the polymers constituting the monolayer film a few microns thick, the selection will be made from the following polymers, as a function of the applications:
polyethylene terephthalate
polypropylene
oriented polypropylene
low-density or high-density polyethylene
ethylene/vinyl acetate copolymers
polyamides 6, 11 or 12
polyvinyl chloride
polyvinylidene chloride
ethylene/vinyl alcohol copolymers.

One feature of the invention resides broadly in a process for the realization of a flexible tubular structure composed of an internal tube 2, possibly with a reinforcement layer 3 and a coating 4, and also including a sealant barrier 5, 5' against the fluids carried or against external aggressive agents, characterized by the fact that said sealant barrier 5, 5', consisting of a multilayer film a few microns thick, is oriented longitudinally in a continuous manner, in the form of a ribbon, and forms an envelope whose overlapping of the strips 8 is parallel to the generatrices of said flexible tubular structure, the closing of said multilayer film a few microns thick being provided by the sealed superimposition of its surfaces on the surface of said overlap, and by the fact that a final heat treatment produces an intimate bonding of all the constituent elements of said flexible tubular structure.

Another feature of the invention resides broadly in a process for the realization of a flexible tubular structure, characterized by the fact that the multilayer film a few microns thick forming the sealant barrier 5' is continuously deposited on the exposed surface of the internal tube 2, the barrier film 9 of said multilayer film a few microns thick thereby constituting the interior coat 6 of said flexible tubular structure.

Yet another feature of the invention resides broadly in a process for the realization of a flexible tubular structure, characterized by the fact that the multilayer film a few microns thick is deposited, continuously, between an interior coat 6 and a connecting tube 7, the assembly of which constitutes the internal tube 2.

Yet still another feature of the invention resides broadly in a process for the realization of a flexible tubular structure, characterized by the fact that the interior coat 6 and the connecting tube 7 have essentially the same thickness, the multilayer film a few microns thick being located in the vicinity of one-half the thickness of the internal tube 2.

Still yet another feature of the invention resides broadly in a process for the realization of a flexible tubular structure, characterized by the fact that the overlapping of the strips 8 is done over a circumferential length at most equal to the value of the nominal diameter of said flexible tubular structure, and is essentially equal to two hundred times the thickness of said multilayer film a few microns thick.

A further feature of the invention resides broadly in a flexible tubular structure realized in accordance with the process above, characterized by the fact that the multilayer film a few microns thick forming the sealant barrier 5 consists of at least one barrier film 9, performing the sealing function, and at least one contact film 10, performing the function of bonding with said barrier film 9 on one hand, and with the constituent elements of the flexible tubular structure which surround it, on the other hand.

A still further feature of the invention resides broadly in a tubular structure, characterized by the fact that the multilayer film a few microns thick forming the sealant barrier 5 is made of a barrier film 9 combined with a contact film 10.

A yet further feature of the invention resides broadly in a flexible tubular structure, characterized by the fact that the multilayer film a few microns thick forming the sealant barrier 5 is made of a barrier film 9 sandwiched between two contact films 10.

A still yet further feature of the invention resides broadly in a flexible tubular structure, characterized by the fact that the multilayer film a few microns thick forming the sealant barrier 5, 5' has a thickness between 13 and 40 microns, the thickness of the barrier film 9 being between 10 and 30 microns, and that of the contact film 10 being between 3 and 5 microns.

A yet further feature of the invention resides broadly in a flexible tubular structure, characterized by the fact that the barrier film 9 consists of polyethylene terephthalate, the contact film 10 being made of polyvinylidene chloride.

A still further feature of the invention resides broadly in a flexible hose for transport of liquid or gaseous fluids comprising a sealant barrier 5 or 5' consisting of a multilayer film a few microns thick, characterized by the fact that said flexible hose has a structure as disclosed above.

Another feature of the invention resides broadly in an expansion compensator sleeve for industrial pipelines, comprising a sealant barrier 5 or 5', consisting of a multilayer film a few microns thick, characterized by the fact that said expansion compensator sleeve has a structure as disclosed above.

Extrusion apparatus and methods are disclosed in U.S. Pat. No. 4,753,767 entitled "Extrusion Apparatus and Method", U.S. Pat. No. 4,118,453 entitled "Method and Apparatus for the Extrusion of Tubular Thermoplastic Film," U.S. Pat. No. 4,490,316 entitled "Apparatus and method for controlling internal size of an extruded hose", and U.S. Pat. No. 3,953,270 entitled "Manufacture of reinforced polymeric hose."

Manufacture of thin films is disclosed in U.S. Pat. No. 5,076,987 entitled "Process for the production of optically isotropic extrusion films."

Braiding and wrapping of tubular structures is disclosed in U.S. Pat. No. 5,043,538 entitled "Water Resistant Cable Construction" and U.S. Pat. No. 4,704,596 entitled "Extrusion Coated Ignition Wire."

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modification and variations thereof may be made without departing from the spirit and scope of the invention.

What is claimed is:

1. Process for the manufacture of a motor vehicle hose and using the motor vehicle hose on an internal combustion engine of a motor vehicle, said process comprising the steps of:
   extruding a first polymeric layer;
   applying a sealant barrier to said first polymeric layer, said sealant barrier comprising a multilayer film, said multilayer film being a few microns thick, said multilayer film comprising a polymeric barrier film;
   said polymeric barrier film consisting essentially of a material configured for minimizing permeation of motor fluids through said motor vehicle hose;
   overlapping a first portion of said sealant barrier with a second portion of said sealant barrier to create an overlapped portion of said sealant barrier;
   extruding a second polymeric layer onto said sealant barrier, so that said sealant barrier lies between said first polymeric layer and said second polymeric layer;
   applying a reinforcement layer to said second polymeric layer;
   extruding a third polymeric layer onto said reinforcement layer, said third polymeric layer being the outermost layer of said motor vehicle hose, said third polymeric layer being configured for withstanding influences external to said motor vehicle hose in an engine compartment in a motor vehicle;
   heat treating said motor vehicle hose to achieve an intimate bonding of all layers of said motor vehicle hose and to seal said overlapped portion of said sealant barrier; and
   mounting the motor vehicle hose on the internal combustion engine of the motor vehicle.

2. The process according to claim 1, wherein:
   said motor vehicle hose is configured for conveying at least one of the following internal aggressive agents:
      oxygenated automotive fuels, said multilayer film being configured for sealing against the oxygenated automotive fuels; and
      two-phase fluids in cooling systems, said multilayer film being configured for sealing against the two-phase fluids;
   said first polymeric layer comprises a first tubular structure, said first tubular structure having an internal surface and an external surface;
   said first tubular structure comprises an internal cavity and being configured for conveying fluid through said internal cavity;
   said step of applying said sealant barrier comprises applying said sealant barrier directly onto said external surface of said first tubular structure;
   said second polymeric layer comprises a second tubular structure; and
   said step of extruding said second polymeric layer comprises extruding said second tubular structure directly onto said sealant barrier, to make contact with said sealant barrier.

3. The process according to claim 2, wherein said motor vehicle hose is a flexible tube.

4. The process of claim 3, wherein:
   said first polymeric layer and said second polymeric layer have substantially the same thickness;
   said overlapped portion of said sealant barrier has a length essentially equal to 200 times the thickness of said sealant barrier;
   said multilayer film further comprises:
      two contact films for bonding said barrier films to said first and second polymeric layers, said barrier film is sandwiched between said two contact films;
   said multilayer film is between 16 and 40 microns thick;
   said barrier film is between 10 and 30 microns thick;
   said two contact films are each between 3 and 5 microns thick;
   said barrier film comprises polyethylene terephthalate; and
   said contact film comprises polyvinyl chloride;
   said multilayer film is configured for performing a sealing function against external aggressive agents, the external aggressive agents including oxygen and ozone;

said step of applying a sealant barrier comprises applying a sealant barrier to the outside of said first tubular structure, said sealant barrier comprising a multilayer film is in the form of a continuous ribbon having two longitudinal edges and said ribbon is applied to the first tubular structure as follows:
  orienting said ribbon longitudinally along said first tubular structure;
  wrapping said first tubular structure with said ribbon;
  overlapping said two edges of said ribbon longitudinally along said first tubular structure to form said overlapped portion;
a first of said two contact films is for being disposed towards said first polymeric layer;
a second of said two contact films is for being disposed towards said second polymeric layer;
said first contact film is configured for:
  bonding a major portion of said barrier film to said first polymeric layer; and
  bonding with said second contact film at a minor portion of said barrier film to form said overlapped portion of said sealant barrier;
said second contact film is configured for:
  bonding a major portion of said barrier film to said second polymeric layer; and
  bonding with said first contact film at a minor portion of said barrier film to form said overlapped portion of said sealant barrier;
said reinforcement layer comprises a textile material;
said barrier film has a relative thickness with respect to said first polymeric layer and a relative thickness with respect to said second polymeric layer;
said relative thickness of said barrier film with respect to said first polymeric layer and said relative thickness of said barrier film with respect to said second polymeric layer are configured for compensating for differences in modulus of elasticity between said barrier film, said first polymeric layer and said second polymeric layer;
said second tubular structure comprises an internal surface for being disposed towards said first tubular structure and an external surface for being disposed away from said first tubular structure; and
said step of applying said reinforcement layer comprises applying said reinforcement layer directly onto said external surface of said second tubular structure;
said first tubular structure is configured for conveying motor fluids in an internal combustion engine of a motor vehicle; and
said first tubular structure is made of a material configured for conveying said at least one of:
  oxygenated automotive fuels; and
  two-phase fluids in cooling systems.

* * * * *

UNITED STATES PATENT AND TRADEMARK OFFICE
CERTIFICATE OF CORRECTION

PATENT NO. : 5,380,385
DATED : January 10, 1995
INVENTOR(S) : Georges DERROIRE et al.

It is certified that error appears in the above-indentified patent and that said Letters Patent is hereby corrected as shown below:

In Column 7, line 62, after 'barrier' delete "B" and insert --5--.

In Column 16, line 53, Claim 4, after 'barrier', delete "films" and insert --film--.

Signed and Sealed this

Sixth Day of June, 1995

BRUCE LEHMAN

Attest:

Attesting Officer

Commissioner of Patents and Trademarks